United States Patent
Kim et al.

(10) Patent No.: US 11,727,279 B2
(45) Date of Patent: Aug. 15, 2023

(54) METHOD AND APPARATUS FOR PERFORMING ANOMALY DETECTION USING NEURAL NETWORK

(71) Applicants: Samsung Electronics Co., Ltd., Suwon-si (KR); POSTECH Research and Business Development Foundation, Pohang-Si (KR)

(72) Inventors: Hyunsoo Kim, Suwon-si (KR); Jaeyoon Sim, Pohang-si (KR); Jaehan Park, Pohang-si (KR); Hyunwoo Son, Pohang-si (KR); Sangjoon Kim, Hwaseong-si (KR)

(73) Assignees: Samsung Electronics Co., Ltd., Gyeonggi-do (KR); POSTECH Research and Business Development Foundation, Pohang-Si (KR)

( * ) Notice: Subject to any disclaimer, the term of this patent is extended or adjusted under 35 U.S.C. 154(b) by 490 days.

(21) Appl. No.: 16/781,328

(22) Filed: Feb. 4, 2020

(65) Prior Publication Data

US 2020/0394526 A1 Dec. 17, 2020

(30) Foreign Application Priority Data

Jun. 11, 2019 (KR) .................. 10-2019-0068809

(51) Int. Cl.
*G06F 17/18* (2006.01)
*G06N 3/088* (2023.01)

(52) U.S. Cl.
CPC .............. *G06N 3/088* (2013.01); *G06F 17/18* (2013.01); *G06F 2218/12* (2023.01)

(58) Field of Classification Search
CPC ............ G06K 9/6271; G06K 9/00536; G06N 3/0454; G06N 3/088; G06N 3/084; G06V 10/82; G06F 17/18
See application file for complete search history.

(56) References Cited

U.S. PATENT DOCUMENTS

| | | | |
|---|---|---|---|
| 2015/0363925 | A1 | 12/2015 | Shibuya et al. |
| 2018/0110471 | A1 | 4/2018 | Bandyopadhyay et al. |
| 2019/0302707 | A1* | 10/2019 | Guo ........................ G06N 3/088 |

(Continued)

FOREIGN PATENT DOCUMENTS

| | | |
|---|---|---|
| CN | 108375534 A | 8/2018 |
| KR | 101350599 B1 | 1/2014 |

(Continued)

OTHER PUBLICATIONS

Chandola, V. et al. "Anomaly detection: A survey." *ACM Comput. Surv.* vol. 41, No. 3 (Jul. 2009): 58 pages.

(Continued)

*Primary Examiner* — Yoshihisa Ishizuka
(74) *Attorney, Agent, or Firm* — Harness, Dickey & Pierce, P.L.C.

(57) ABSTRACT

A method and apparatus for performing anomaly detection by using a neural network are provided. The apparatus is configured to extract input features of an input data signal, obtain output features of the neural network by processing the input features through the neural network, obtain an error based on the input features and the output features, and determine whether the input data signal indicates an abnormal signal based on the error and a threshold.

15 Claims, 12 Drawing Sheets

(56) References Cited

U.S. PATENT DOCUMENTS

| | | | | |
|---|---|---|---|---|
| 2020/0050941 A1* | 2/2020 | Zhuang | ................ | G06N 3/084 |
| 2020/0076841 A1* | 3/2020 | Hajimirsadeghi | ... | G06N 3/0454 |
| 2020/0285555 A1* | 9/2020 | Suh | .................. | G06F 11/0709 |
| 2020/0320402 A1* | 10/2020 | Yoon | .................... | G06N 3/088 |
| 2021/0397938 A1* | 12/2021 | Tora | ...................... | G06N 3/063 |

FOREIGN PATENT DOCUMENTS

| | | |
|---|---|---|
| KR | 101911061 B1 | 10/2018 |
| WO | WO-2015/146082 A1 | 10/2015 |

OTHER PUBLICATIONS

Habeeb, R.A.A. et al. "Real-time big data processing for anomaly detection: A Survey." *International Journal of Information Management* (Sep. 2018): 34 pages.

Thodoroff, P. et al. "Learning Robust Features using Deep Learning for Automatic Seizure Detection." Proceedings of Machine Learning and Healthcare 2016, JMLR W&C Track, vol. 56 (2016): 12 pages.

Yoo, J.H. "Epileptic Seizure Detection for Multi-channel EEG with Recurrent Convolutional Neural Networks." *J. Inst. Korean Electr. Electron. Eng.* vol. 22, No. 4 (Dec. 2018): 5 pages.

Verma, N. et al. "Data-Driven Approaches for Computation in Intelligent Biomedical Devices: A Case Study of EEG Monitoring for Chronic Seizure Detection." *Journal of Low Power Electronics and Applications* vol. 1, No. 3 (Apr. 2011): 26 pages.

* cited by examiner

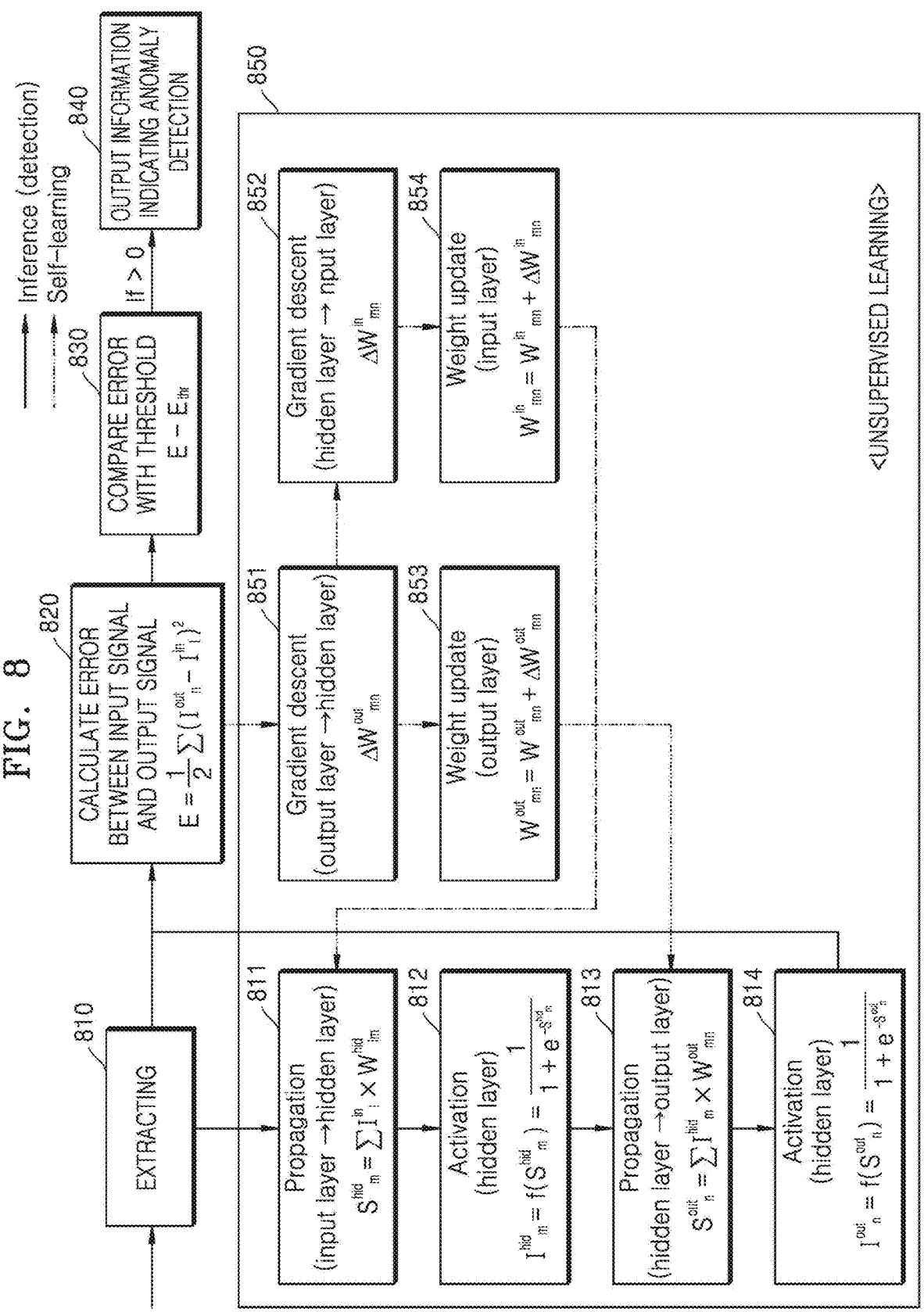

FIG. 10

| AUC | Patient A | Patient B | Patient C | Patient D | Patient E | Mean |
|---|---|---|---|---|---|---|
| # of hidden neurons = 1 | 0.9619 | 0.9632 | 0.9576 | 0.9673 | 0.9855 | 0.9671 |
| # of hidden neurons = 5 | 0.9632 | 0.9627 | 0.9551 | 0.9691 | 0.9877 | 0.96756 |
| # of hidden neurons = 10 | 0.9779 | 0.9471 | 0.9602 | 0.9802 | 0.9819 | 0.96945 |
| # of hidden neurons = 50 | 0.978 | 0.9147 | 0.9607 | 0.9798 | 0.9828 | 0.9632 |
| # of hidden neurons = 250 | 0.9625 | 0.9607 | 0.9579 | 0.9624 | 0.9677 | 0.96224 |
| 2 layer (378-100-50) | 0.9725 | 0.9652 | 0.9584 | 0.9858 | 0.9811 | 0.9726 |
| 3 layer (378-250-50-5) | 0.9632 | 0.9659 | 0.9591 | 0.9798 | 0.9852 | 0.97064 |

| Seizure Detection Algorithms | Sensitivity (%) | FPR (per hour) |
|---|---|---|
| Ref.1 | 85 | 0.8 |
| Ref.2 | 90 | 0.85 |

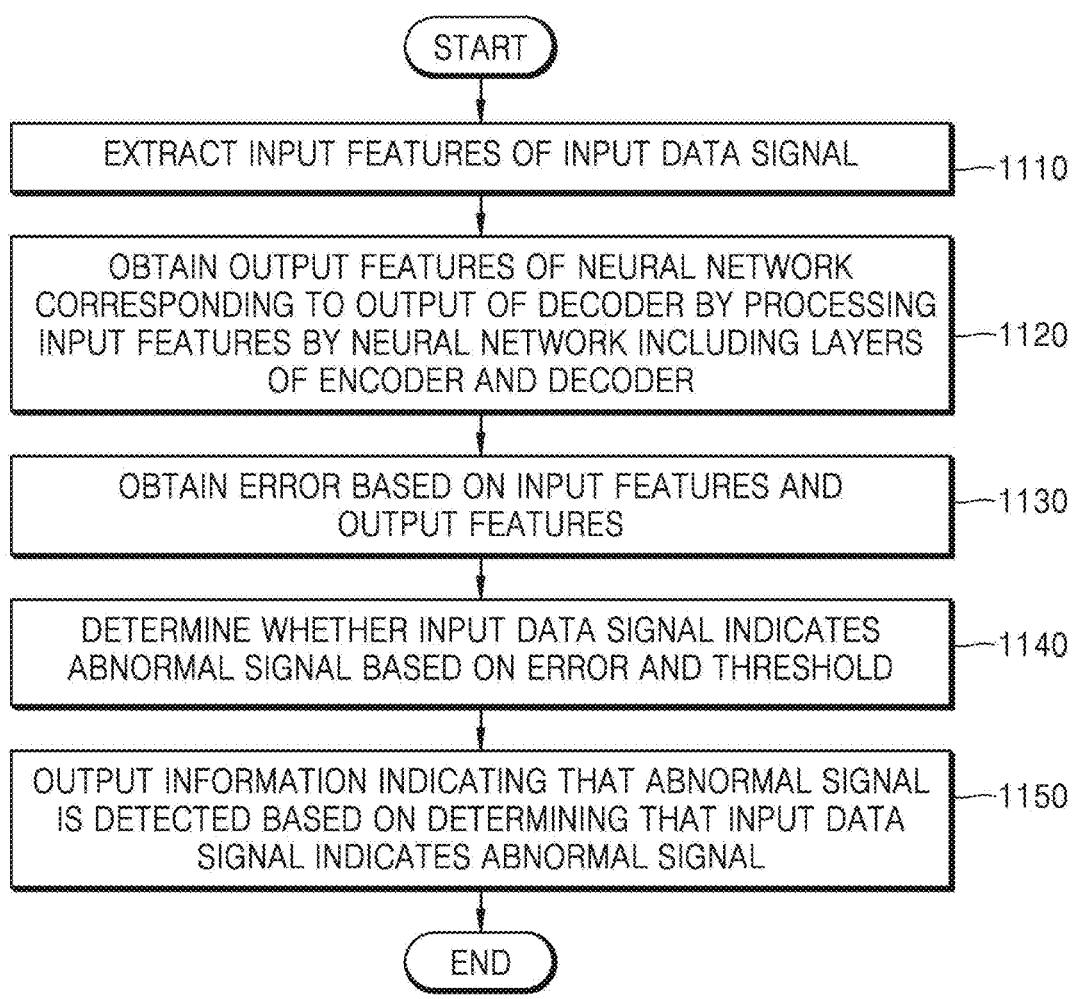

METHOD AND APPARATUS FOR PERFORMING ANOMALY DETECTION USING NEURAL NETWORK

CROSS-REFERENCE TO RELATED APPLICATION

This application claims the benefit of Korean Patent Application No. 10-2019-0068809, filed on Jun. 11, 2019, in the Korean Intellectual Property Office, the disclosure of which is incorporated herein in its entirety by reference.

BACKGROUND

1. Field

The present disclosure relates to methods and apparatuses for performing anomaly detection by using a neural network.

2. Description of the Related Art

Recently, as neural network technology has been developed, research to analyze input data and extract valid information by utilizing the neural network in various types of electronic systems is being actively conducted. In particular, in various technical fields such as cyber-intrusion detection, sensor networks anomaly detection, medical anomaly detection, and industrial damage detection, in order to prevent accidents through anomaly detection for recognizing and determining in realtime a situation in which an abnormal signal is generated during activities in which a large number of continuous normal signals are generated, techniques for more efficient anomaly detection using neural network systems have been developed.

SUMMARY

Provided are methods and apparatuses for performing anomaly detection by using a neural network. However, the present disclosure is not limited thereto, as may be inferred from example embodiments, some of which are presented herein.

Additional aspects will be set forth in part in the description which follows and, in part, will be apparent from the description, or may be learned by practice of the presented embodiments.

According to some example embodiments, a method of performing anomaly detection by using a neural network includes: extracting input features of an input signal; processing the input features by the neural network including layers of an encoder and a decoder to obtain output features of the neural network corresponding to an output of the decoder; obtaining an error based on the input features and the output features; determining whether the input data signal indicates an abnormal signal based on the error and a threshold; and outputting information indicating that the abnormal signal is detected based on determining that the input data signal indicates the abnormal signal.

According to some example embodiments, a computer-readable recording medium includes a recording medium having recorded thereon one or more programs including instructions for executing the method.

According to some example embodiments, an apparatus for performing anomaly detection by using a neural network includes: a memory storing at least one program; and processing circuitry configured to perform the anomaly detection by executing the at least one program, wherein the processing circuitry is configured to: extract input features of an input signal, process the input features by a neural network including layers of an encoder and a decoder to obtain output features of the neural network corresponding to an output of the decoder, obtain an error based on the input features and the output features, determine whether the input data signal indicates an abnormal signal based on the error and a threshold, and output information indicating that the abnormal signal is detected based on determining that the input data indicates an abnormal signal.

BRIEF DESCRIPTION OF THE DRAWINGS

Some example aspects, features, and/or potentially achievable advantages of some example embodiments of the disclosure will be more apparent from the following description taken in conjunction with the accompanying drawings, in which:

FIG. 8 is a diagram for describing, by using mathematical models, processing operations for performing anomaly detection, according to some example embodiments;

FIGS. 9 and 10 are diagrams for describing simulation results for determining whether epilepsy occurs, in an electroencephalogram (EEG) sensor-based epilepsy disease determination system using an anomaly detection apparatus, according to some example embodiments; and FIG. 11 is a flowchart of a method of performing anomaly detection by using a neural network, according to some example embodiments.

DETAILED DESCRIPTION

Figure 1:
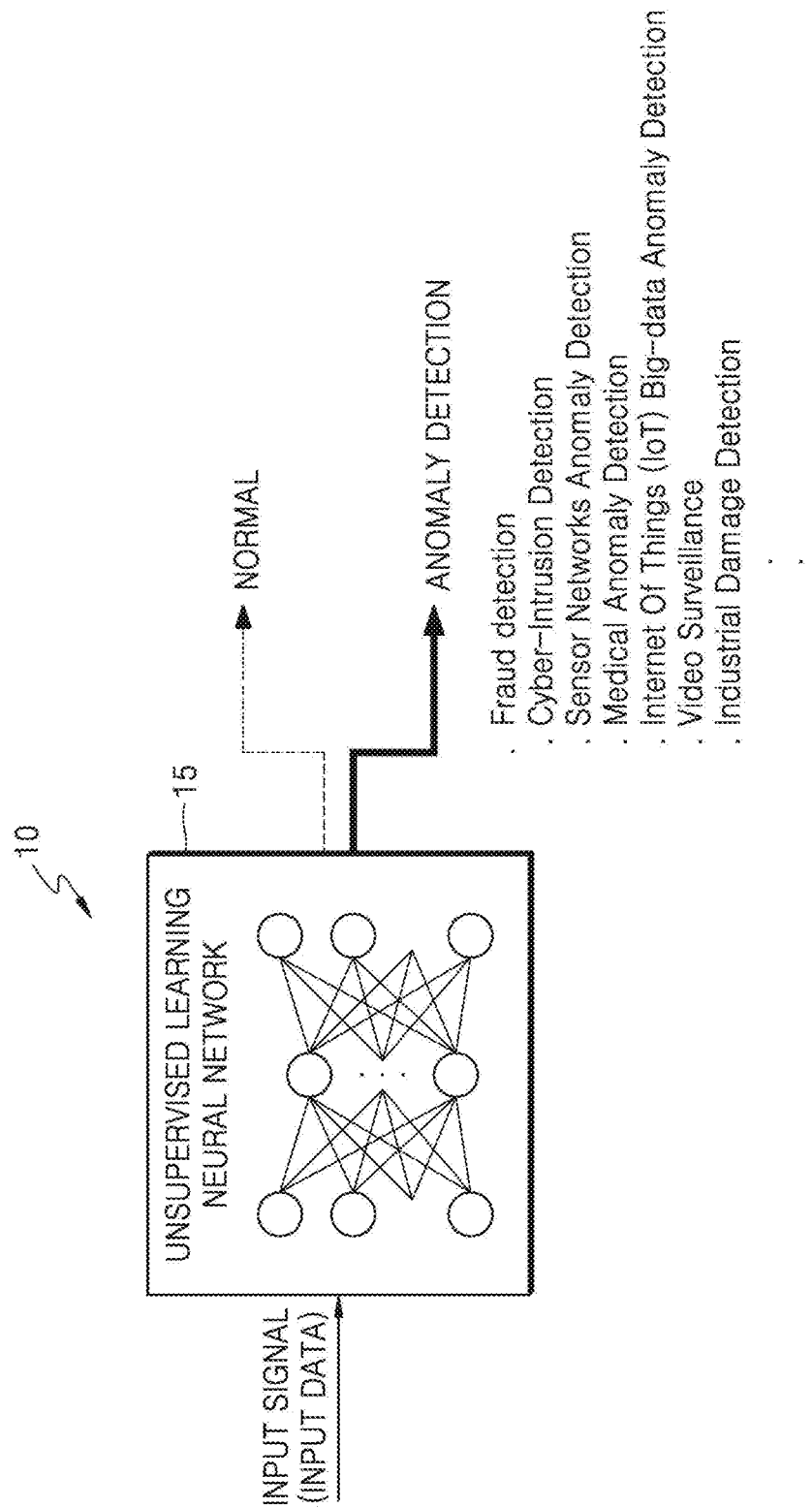
FIG. 1 is a diagram for describing an anomaly detection system according to some example embodiments.

Reference will now be made in detail to some example embodiments, some of which are illustrated in the accompanying drawings, wherein like reference numerals refer to like elements throughout. In this regard, some example embodiments may have different forms and should not be construed as being limited to the descriptions set forth herein. Accordingly, the example embodiments described below may refer to the figures to explain some example aspects. As used herein, the term "and/or" includes any and all combinations of one or more of the associated listed items. Expressions such as "at least one of," when preceding a list of elements, modify the entire list of elements and do not modify the individual elements of the list. The terms "a" and "an" are to be generally interpreted as "one or more."

With respect to the terms used in embodiments of the disclosure, general terms currently and widely used are selected in view of function with respect to the disclosure. However, the terms may vary according to an intention of a technician practicing in the pertinent art, an advent of new technology, etc. In specific cases, definitions of some terms may be described in the description of the corresponding disclosure. Accordingly, the terms used in the description should not necessarily be construed as simple names of the terms, but may be defined based on meanings of the terms and overall contents of the present disclosure.

The terms "consist(s) of" or "include(s) (or comprise(s))" should not be interpreted or understood as including, without exception, all of the plurality of elements or the plurality of steps disclosed in the description. In other words, it should be understood that some of the elements or some of the steps may not be included, or that additional elements or steps may be further included.

Some example embodiments will be described in detail below with reference to accompanying drawings. However, the present disclosure may be implemented in various manners, and is not limited to any of the example embodiments described herein.

FIG. 1 is a diagram for describing an anomaly detection system 10 according to some example embodiments.

Referring to FIG. 1, the anomaly detection system 10 receives various types of input signals or pieces of input data, such as sensing signals measured using a sensor provided in the anomaly detection system 10 or an external device, network data received through a network, and image data obtained through image processing, and performs anomaly detection based on the received input signals or input data. In this case, the anomaly detection system 10 determines whether the input data signal is a signal indicating a normal pattern or a signal indicating an abnormal pattern by using an unsupervised learning neural network 15. If it is determined that the input data signal is a signal indicating an abnormal pattern, the anomaly detection system 10 outputs information indicating anomaly detection.

The anomaly detection system 10 may be employed and used in various technical fields, such as fraud detection, cyber-intrusion detection, sensor networks anomaly detection, medical anomaly detection, Internet of Things (IoT) big-data anomaly detection, video surveillance, and industrial damage detection.

For example, the anomaly detection system 10 may be connected to devices attached to a patient and measuring an electroencephalogram (EEG), an electrocardiogram (ECG), or the like, and/or may periodically monitor the patient's biosignals, and when a biosignal having an abnormal pattern that is different than normal biosignal patterns is generated, the anomaly detection system 10 may detect the biosignal as an abnormal signal. An apparatus involved in the monitoring and/or care of the patient may log the abnormal signal and/or alert one or more caregivers as to the condition of the patient.

The anomaly detection system 10 includes a neural network to determine whether an input data signal is a normal pattern or an abnormal pattern. The neural network may be a neural network that is trained by unsupervised learning.

Learning methods of neural networks may be divided into supervised learning and unsupervised learning. Supervised learning is a method of learning neural network parameters based on a given learning goal and is different from unsupervised learning that is a method of learning neural network parameters with only input data without a given learning goal, for example, based on a similarity or discrepancy between an input data signal and other input data signals.

For example, in the technical field of medical anomaly detection, in order to build a neural network using supervised learning, a learning goal may be set based on the diagnosis of each individual medical expert on many pieces of data related to biosignals, and thus, it may be difficult to build an efficient supervised learning system. On the other hand, a neural network using unsupervised learning may be trained to determine whether the input data signal indicates a normal biosignal pattern or an abnormal biosignal pattern that is different from the normal biosignal pattern, and thus, more efficient learning may be performed. In some cases, the abnormal biosignal pattern may be a specific biosignal pattern that is known to be abnormal, such as an ECG pattern indicating an abnormal heart condition. In other cases, the abnormal biosignal pattern may be any biosignal pattern that is substantially different than a normal biosignal pattern, that is, a biosignal pattern that is known to be typical, customary, and/or expected. In some such cases, the biosignal pattern may be determined to be abnormal by varying from a normal biosignal pattern by at least a threshold.

Figure 2:
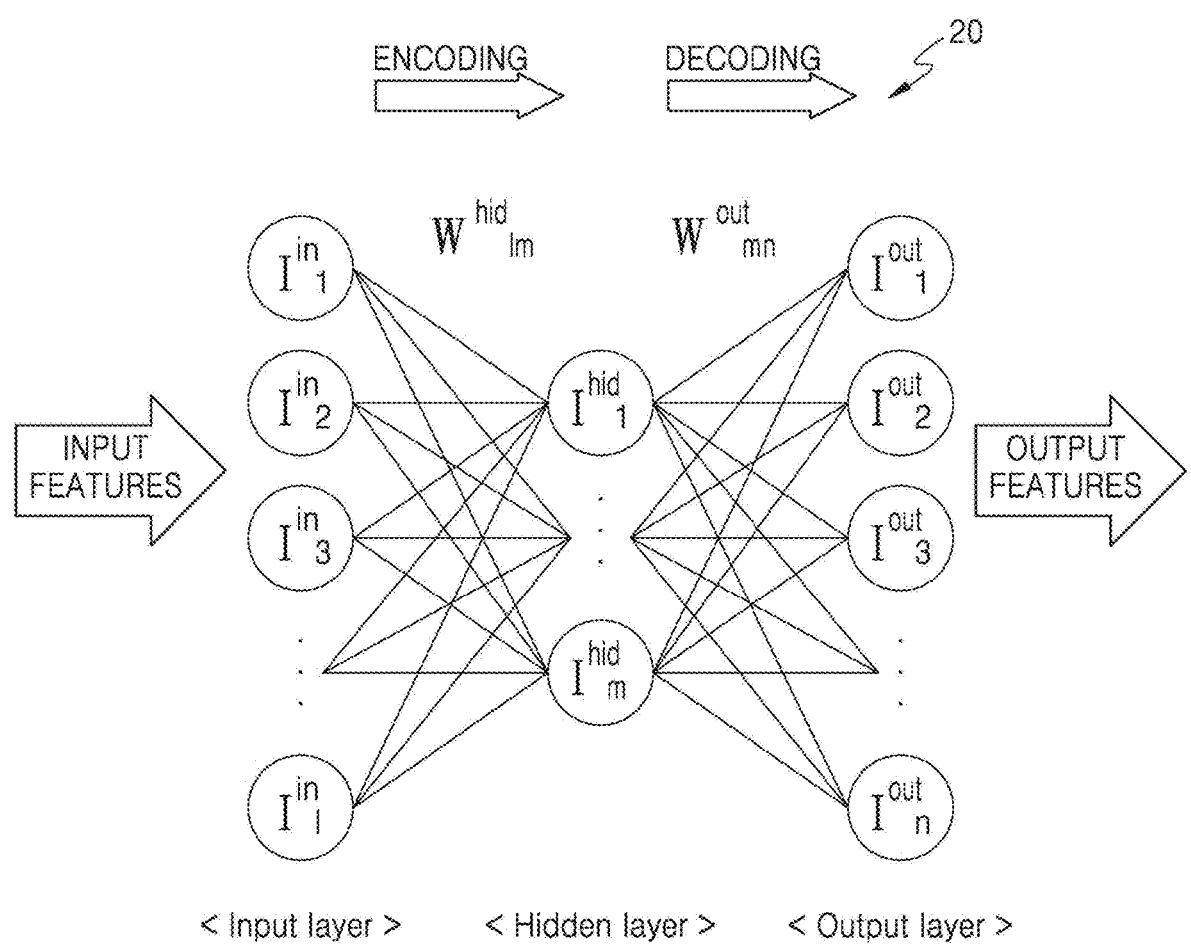
FIG. 2 is a diagram for describing an unsupervised learning neural network according to some example embodiments.

FIG. 2 is a diagram for describing an unsupervised learning neural network according to some example embodiments.

Referring to FIG. 2, a neural network 20 may have an architecture including an input layer, at least one hidden layer, and an output layer. The neural network 20 may correspond to the unsupervised learning neural network 15 shown in FIG. 1.

Each layer of the neural network 20 may include at least one or more nodes (or neurons), and each of the nodes (or the neurons) in each layer may be interconnected with a node (or a neuron) of another layer by one or more links. In a relationship between nodes interconnected between a first layer and a second layer that sequentially follows the first layer, a value of a node of the second layer may be determined based on data inputted to the nodes of the first layer and a weight between the node of the second layer and the nodes of the first layer.

The neural network 20 may include an autoencoder that configures layers of an encoder and a decoder based on the input layer, the (at least one) hidden layer, and the output layer. For example, in the autoencoder, the encoder is sometimes called a recognition network that converts (encodes) input features into an internal representation, and the decoder is sometimes called a generative network that converts (decodes) the internal representation into output features.

The autoencoder is a machine learning model that learns layers of a neural network step by step so that the output of a final layer (i.e., the output layer) reproduces the input of an original layer (i.e., the input layer). In some autoencoders, one or more of the (at least one) hidden layers may include fewer neurons than the input layer, and training result in an autoencoder that compresses input features into a feature vector that is of lower dimensionality than the input feature vector (i.e., that is compressed with respect to the input data signal) and that encodes information that is representative of the input data signal. Further processing of the output of the (one or more) hidden layers by further layers of the autoencoder may result in a reverse process, that is, a decoding of the outputs of the neural network that, reconstructs the compressed results and outputs output features based on the compressed feature vector. In some autoencoders, the output features produced by the decoder of the autoencoder and outputted by the output layer may approximate the input features that are inputted to the input layer and processed by the encoder of the autoencoder.

According to the architecture of some example autoencoders, the dimension (that is, the number of nodes or the number of neurons) of each of the input layer and the output layer may be higher than the dimension of the hidden layer. Thus, due to the presence of such a hidden layer, an input feature may not be output, as it is, as an output feature. For example, the input feature may result from noise, bias, miscalibration, etc. If the input data signal otherwise resembles a training input data signal that was included in the training of the autoencoder, then the autoencoder may produce, as output in response to the input data signal, the output of the autoencoder in response to the training input data signal, that is, disregarding and potentially excluding the input feature resulting from noise, bias, miscalibration, etc. In this manner, the autoencoder performs unsupervised learning on parameters of each layer by using the output feature so that the output feature may efficiently represent the input feature. That is, the autoencoder is a neural network that learns to efficiently reconstruct input features into output features, as shown in FIG. 2, and uses the hidden layer so that the input features are not simply copied to the output features. For example, the autoencoder may compress the input features by configuring the dimension of the hidden layer lower than the dimension of the input layer, as described above, or the autoencoder may add noise to the input features through the hidden layer (e.g., in the case of variational autoencoders).

In some example embodiments, the anomaly detection system 10 in FIG. 1 may be configured to repeatedly train the autoencoder (that is, the neural network 20) by using a signal pattern extracted from the input data signal, thereby repeatedly updating parameters of each layer to allow the autoencoder to classify a signal pattern that may be recognized as a normal signal pattern.

In some example embodiments, the anomaly detection system 10 may be configured to determine that the input data signal indicates an abnormal signal if the autoencoder outputs output features that do not approximate the input features at all.

In some example embodiments, the dimension (i.e., the number of nodes or the number of neurons) of the input layer of the neural network 20 may or may not be the same as the dimension of the output layer. That is, the architecture of the neural network 20 for implementing the autoencoder is not limited to any one of the disclosed example embodiments, and may vary in other example embodiments.

Figure 3:
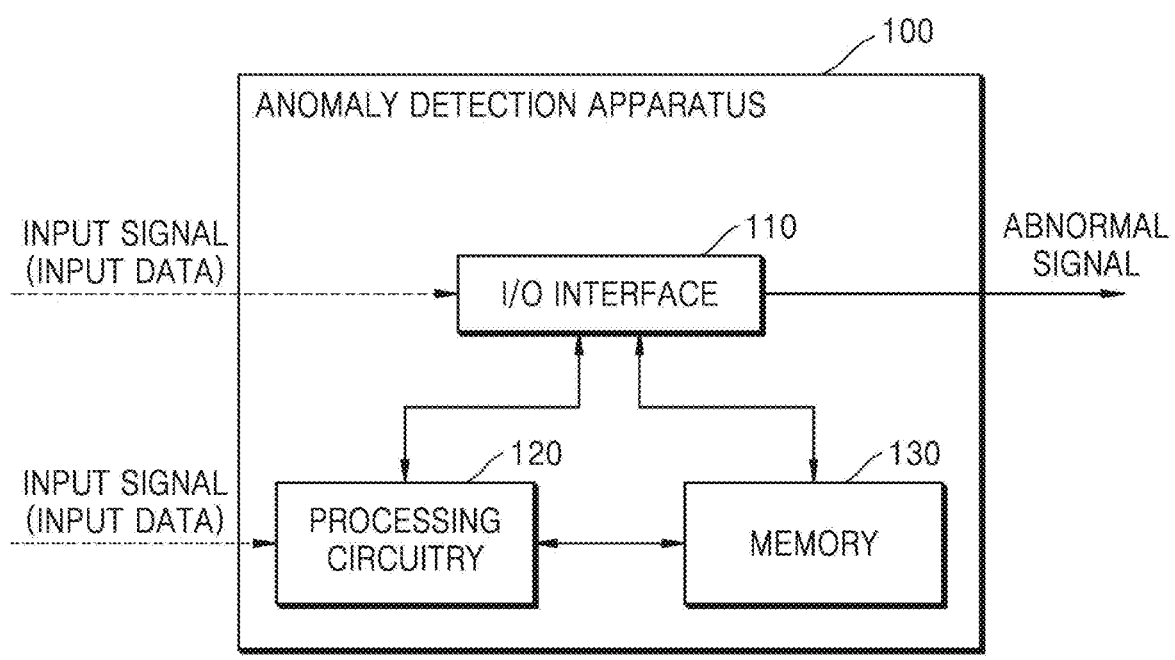
FIG. 3 is a block diagram of an anomaly detection apparatus according to some example embodiments.

FIG. 3 is a block diagram of an anomaly detection apparatus 100 according to some example embodiments.

Referring to FIG. 3, the anomaly detection apparatus 100 corresponds to an apparatus for performing anomaly detection in the anomaly detection system 10 described above. The anomaly detection apparatus 100 includes an input/output (I/O) interface 110, processing circuitry 120, and a memory 130. In the anomaly detection apparatus 100 shown in FIG. 3, only components related to the present embodiments are shown. Thus, the anomaly detection apparatus 100 may further include other components in addition to the components shown in FIG. 3.

The I/O interface 110 may include an input interface for inputting information to the anomaly detection apparatus 100, a display interface for visually providing a user with information processed by the anomaly detection apparatus 100, and/or a wired/wireless network interface for performing network communication with external devices.

The I/O interface 110 may be configured to receive an input data signal from an external device to perform anomaly detection. The input data signal received from the external device may correspond to various types of data signals generated, which may be applicable to fields such as fraud detection, cyber-intrusion detection, sensor networks anomaly detection, medical anomaly detection, Internet of Things (IoT) big-data anomaly detection, video surveillance, and industrial damage detection, some examples of which are described herein.

Based on the anomaly detection apparatus 100 receiving an input data signal through the I/O interface 110, the anomaly detection apparatus 100 is configured to transmit the received input data signal to the processing circuitry 120 so that anomaly detection is performed.

Based on an abnormal signal being detected, the anomaly detection apparatus 100 may output, through the I/O interface 110, information indicating that the abnormal signal is detected. For example, the I/O interface 110 may display the information to a user through the display interface or transmit the information to an external network through the wired/wireless network interface The anomaly detection apparatus 100 may be any of various types of computing devices, such as a personal computer (PC), a server device, a television, a mobile device (e.g., a smartphone or a tablet device), an embedded device, an autonomous vehicle, a wearable device, an augmented reality (AR) device, and an IoT device, and the processing circuitry 120 may correspond to a processing device included in each of the computing devices. For example, in some example embodiments, the processing circuitry 120 may include hardware such as logic circuits; a hardware/software combination, such as a processor executing software; or a combination thereof. For example, a processor may include, but is not limited to, a central processing unit (CPU), a graphics processing unit (GPU), an application processor (AP), a neural processing unit (NPU), a tensor processing unit (TPU), a digital signal processor, a microcomputer, a field programmable gate array (FPGA), a System-on-Chip (SoC), a programmable logic unit, a microprocessor, application-specific integrated circuit (ASIC), etc.

The processing circuitry 120 is configured to perform overall functions for controlling the anomaly detection apparatus 100 provided with the processing circuitry 120. The processing circuitry 120 may be configured to control the anomaly detection apparatus 100 by executing programs stored in the memory 130. For example, the processing circuitry 120 may be configured to execute various processes for determining whether an input data signal received by the anomaly detection apparatus 100 indicates an abnormal signal.

Although it has been described that the input data signal is received through the I/O interface 110, the present disclosure is not limited thereto, and in some other example embodiments the input data signal may be directly received by the processing circuitry 120. Although not shown in the example embodiments included in the drawings, the anomaly detection apparatus 100 in some other example embodiments may also include a sensor or other measurement device. In t example embodiment shown in FIG. 3, the processing circuitry 120 may be configured to directly receive from the sensor or the other measurement device a data signal, sensed or measured by the sensor or the other measurement device, as an input data signal.

The memory 130 is hardware for storing various types of data processed in the processing circuitry 120 and may be configured to store, for example, neural network data related to the unsupervised learning neural network 15, data generated while the processing circuitry 120 trains the unsupervised learning neural network 15, and/or learned neural network data. In addition, the memory 130 may be configured to store various applications to be driven by the processing circuitry 120, for example, an application for neural network inference and learning and/or an application including an algorithm for determining an abnormal signal.

The memory 130 may include at least one of a volatile memory and a nonvolatile memory. Examples of the nonvolatile memory include read-only memory (ROM), programmable ROM (PROM), electrically programmable ROM (EPROM), electrically erasable and programmable ROM (EEPROM), flash memory, phase-change random access memory (PRAM), magnetic RAM (MRAM), resistive RAM (RRAM), ferroelectric RAM (FRAM), and the like. Examples of the volatile memory include dynamic RAM (DRAM), static RAM (SRAM), synchronous DRAM (SDRAM), PRAM, MRAM, RRAM, FRAM, and the like. In some example embodiments, the memory 130 may include at least one of a hard disk drive (HDD), a solid-state drive (SSD), a compact flash (CF), a secure digital (SD), a micro-SD, a mini-SD, an extreme digital (xD), and a memory stick.

Hereinafter, specific operations related to anomaly detection by the processing circuitry 120 will be described.

Figure 4:
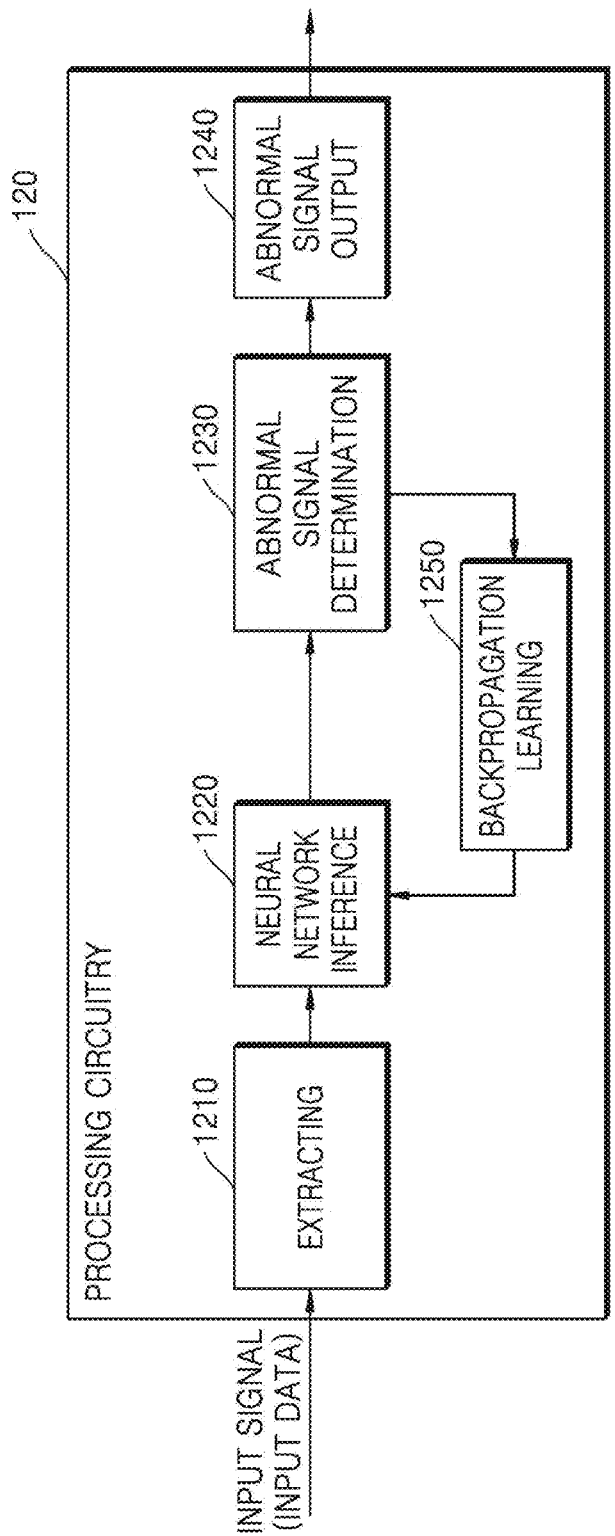
FIG. 4 is a diagram for describing specific operations that are executed to perform anomaly detection in processing circuitry, according to some example embodiments.

FIG. 4 is a diagram for describing operations that may be executed to perform anomaly detection in processing circuitry, according to some example embodiments.

Referring to FIG. 4, in operation 1210, the processing circuitry 120 performs extracting input features of an input data signal. Each of the input features may correspond to a feature vector having a predetermined dimension m from the input data signal, and the extracting may include feature extraction, for example by a predetermined bandpass filter or the like, but it is not limited thereto and may also be performed by various ways. For example, in some example embodiments, the input features of the input data signal may include the entire input data signal; that is, the input features processed by the neural network is an unmodified copy of the input data signal. In some example embodiments, the input features of the input data signal may include one or more portions of the input data signal; that is, the input features processed by the neural network may be a selection, subset, and/or range of the input data signal, where each input feature is an unmodified copy of a corresponding portion of the input data signal. The type of input features extracted by the processing circuitry 120 is not limited to any one and may correspond to information representing data characteristics, data expressions, and the like included in the input data signal, which are known in the art. In addition, feature extraction included in the extracting of the input features may likewise be performed using methods known in the art. In addition, feature extraction included in the extracting of the input features may include processing the input data signal, for example, mathematically or logically manipulating and/or augmenting the input data signal. In addition, feature extraction included in the extracting of the input features may be based on a previous input data signal as well as a current input data signal, for example, a sequential and/or convolutional operation that is applied over a sequence or set of input data signals, where the operation performed on the current input data signal is based on one or more previously received input data signals.

In operation 1220, the processing circuitry 120 processes the input features by the neural network 15 (see FIG. 1) including the layers of the encoder and the decoder, and thus obtains output features of the neural network 15, which correspond to the output of the decoder.

In operation 1230, the processing circuitry 120 obtains an error based on the input features and the output features and determines whether the input data signal indicates an abnormal signal based on the error and a threshold. In some example embodiments, the threshold may be a threshold value, and the determining may include subtracting the threshold value from the error and determining whether the magnitude of the difference is greater than (and/or equal to) zero. In some other example embodiments, the threshold may be a range (for example, a range of errors that indicate non-anomalous input data signals), and the determining may include determining whether the error is within the range (indicating that the input data signal is non-anomalous) or outside the range (indicating that the input data signal is anomalous). That is, the threshold may define one or more boundaries that distinguish between errors of anomalous input data signals and errors of non-anomalous input data signals. In some other example embodiments, the threshold may represent errors of typical, customary, exemplary, and/or expected input data signals, or a range of such errors, and the determining may include determining whether the error resembles the threshold (indicating a non-anomalous input data signal) or does not resemble the threshold (indicating an anomalous input data signal).

The error based on the input features and the output features may be obtained in various ways. In some example embodiments, the error may be determined by calculating a mean squared error (MSE) between the input features and the output features. For example, when each of the input and output features corresponds to an m-dimensional feature vector, the error may correspond to an MSE of a vector difference between m-dimensional feature vectors. However, the present disclosure is not limited thereto, and in some other example embodiments, the error may be calculated using other statistics (e.g., mean squared deviation (MSD) and root mean square error (RMS)) for representing a statistical difference between the input features and the output features.

In some example embodiments, the threshold may be predefined to a predetermined value so as to be suitable for the application field, the use environment, etc. of the anomaly detection apparatus 100 and may be variously changed. In some other example embodiments, the threshold may not be predefined, but may be determined in an adaptive and/or ad-hoc manner, for example, based on input received from another system that indicates the threshold, where such input may be received before, during, or after determining the error.

Also in operation 1230, the processing circuitry 120 determines that the input data signal indicates an abnormal signal based on the error and a threshold, for example, by comparing the error and the threshold and determining when the error exceeds the threshold.

In operation 1240, when it is determined that the input data signal indicates an abnormal signal, the processing circuitry 120 outputs information indicating that the abnormal signal is detected. In some example embodiments, the processing circuitry 120 may output the information only when the abnormal signal is detected, and may not output information when the abnormal signal is not detected. In this case, since the processing circuitry 120 and the anomaly detection apparatus 100 may consume network resources at low power by selectively outputting information only with respect to the abnormal signal, the anomaly detection apparatus 100 may efficiently operate. In other example embodiments, the processing circuitry 120 outputs information indicating that the abnormal signal is detected based on some input data signals, and outputs information indicating that the abnormal signal is not detected based on other input data signals.

In operation 1250, when the output features are obtained, the processing circuitry 120 processes backpropagation learning by performing unsupervised learning on the neural network 15 based on the output features.

In some example embodiments, the processing circuitry 120 may be configured to update the weights of the input layer of the neural network 15 and the weights of the output layer of the neural network 15 so that the error indicated by the input features and the output features (for example, an error calculated as a difference between the input features and the output features) decreases through unsupervised learning. For example, unsupervised learning may include updating the weights by performing learning so that the error decreases according to a gradient descent. The unsupervised learning may include self-learning.

In some example embodiments, the processing circuitry 120 may be configured to update the weights of each layer through a predetermined number of batch learnings. For example, the processing circuitry 120 may be configured to perform unsupervised learning only a predetermined number of times with respect to the neural network 15 and then perform anomaly detection with a finally trained neural network. The predetermined number may be variously changed. In contrast, the processing circuitry 120 may be configured to update the weights of each layer through online learning. That is, the processing circuitry 120 may be configured to update the weights by continuously performing unsupervised learning whenever output features are obtained. However, some other example embodiments may include methods in which the processing circuitry 120 performs unsupervised learning in various ways other than those shown and/or discussed herein.

Figure 5:
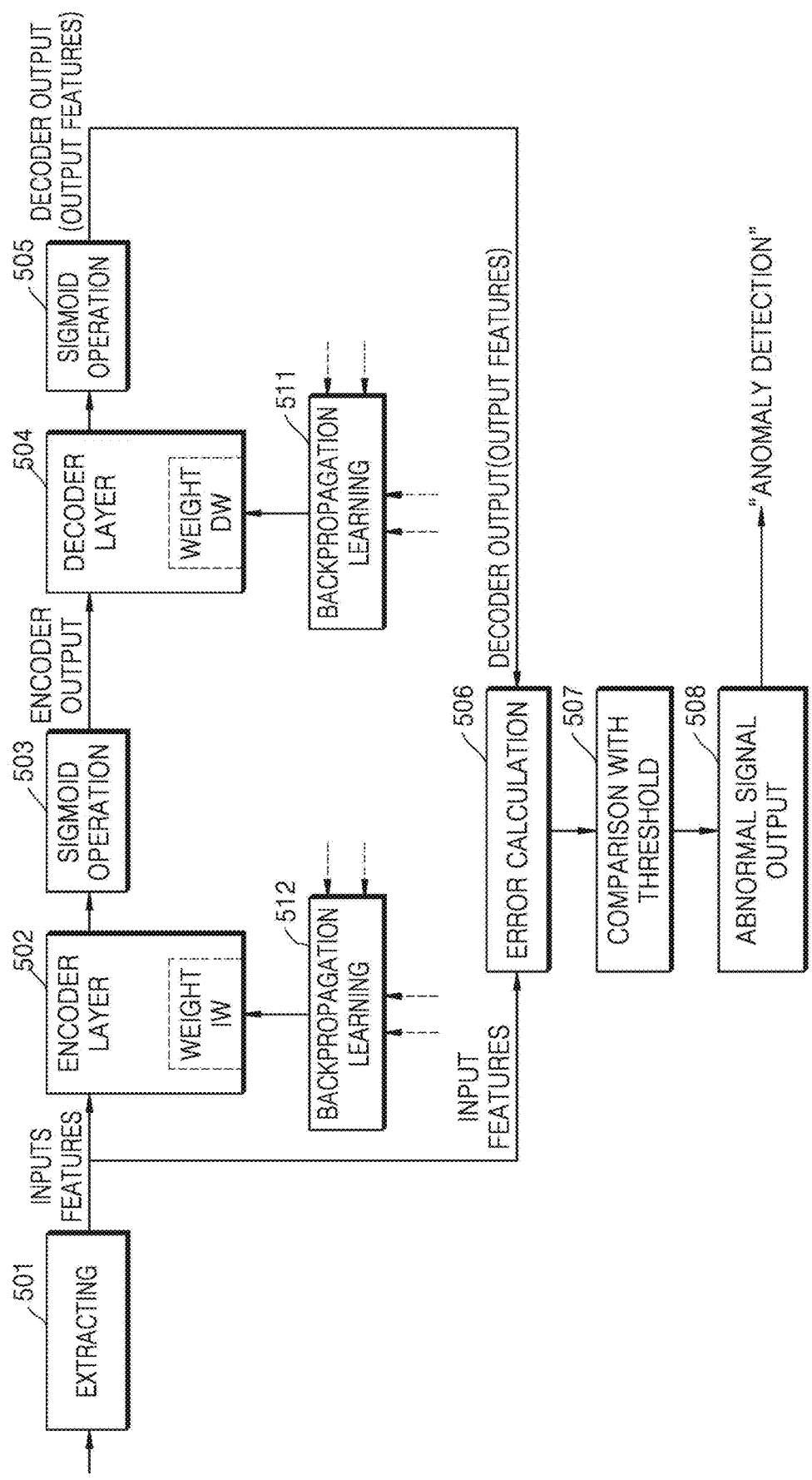
FIG. 5 is a diagram for describing processing operations for performing anomaly detection, according to some example embodiments.

FIG. 5 is a diagram for describing processing operations for performing anomaly detection, according to some example embodiments.

Referring to FIG. 5, since the processing operations are related to some example embodiments, such as those described with reference to the above-mentioned drawings, the descriptions given with reference to the above-mentioned drawings may be equally applied to FIG. 5, even if omitted below.

In operation 501, the processing circuitry 120 extracts input features of an input data signal.

In operation 502, the processing circuitry 120 performs inputting the input features to the input layer of the neural network 15 (see FIG. 1), and the processing circuitry 120 performs an operation between the input features and a weight IW of an input layer-hidden layer and obtain the output of the input layer.

In operation 503, the processing circuitry 120 obtains an encoder output by performing a sigmoid operation on the output of the input layer. The sigmoid operation is, for example, an operation using an activation function, such as (for example) a sigmoid function or a rectified linear unit (ReLU), and is an operation for obtaining the activation (i.e., an encoder output) of the input layer.

In operation 504, the encoder output is input to the inputs of the output layer of the neural network 15, and the processing circuitry 120 performs an operation between the encoder output and a weight DW of a hidden layer-output layer and obtains the output of the output layer.

In operation 505, the processing circuitry 120 obtains a decoder output by performing a sigmoid operation on the output of the output layer. Here, the decoder output corresponds to the output features described above.

Operations 502 to 503 may correspond to an encoding process between the input layer and the hidden layer (encoder) shown in FIG. 2, and operations 504 to 505 may correspond to a decoding process between the hidden layer and the output layer (decoder) shown in FIG. 2.

In operation 506, the processing circuitry 120 obtains an error based on the input features and the output features. The error based on the input features and the output features may be, but is not limited to, calculated based on mean squared error (MSE) between the input features and the output features.

In operation 507, the processing circuitry 120 determines whether the input data signal indicates an abnormal signal based on the error and a threshold. In some examples, the input data signal to be determined by the processing circuitry 120 may be an input data signal that has been rarely input in the past (such as during training), and an error based on the input features and the output features output by the unsupervised learning neural network 15 may be large. Otherwise, the input data signal to be determined by the processing circuitry 120 may be an input data signal frequently input in the past (such as during training), and the error based on the input features and the output features output by the unsupervised learning neural network 15 may be small.

In operation 508, based on determining that the input data signal indicates an abnormal signal, the processing circuitry 120 outputs information indicating that the abnormal signal is detected.

In operations 511 and 512, the processing circuitry 120 may update the weight of the input layer-hidden layer and the weight of the hidden layer-output layer based on weight adjustment values obtained by the gradient descent, and thus may perform backpropagation learning of the neural network 15.

Figure 6:
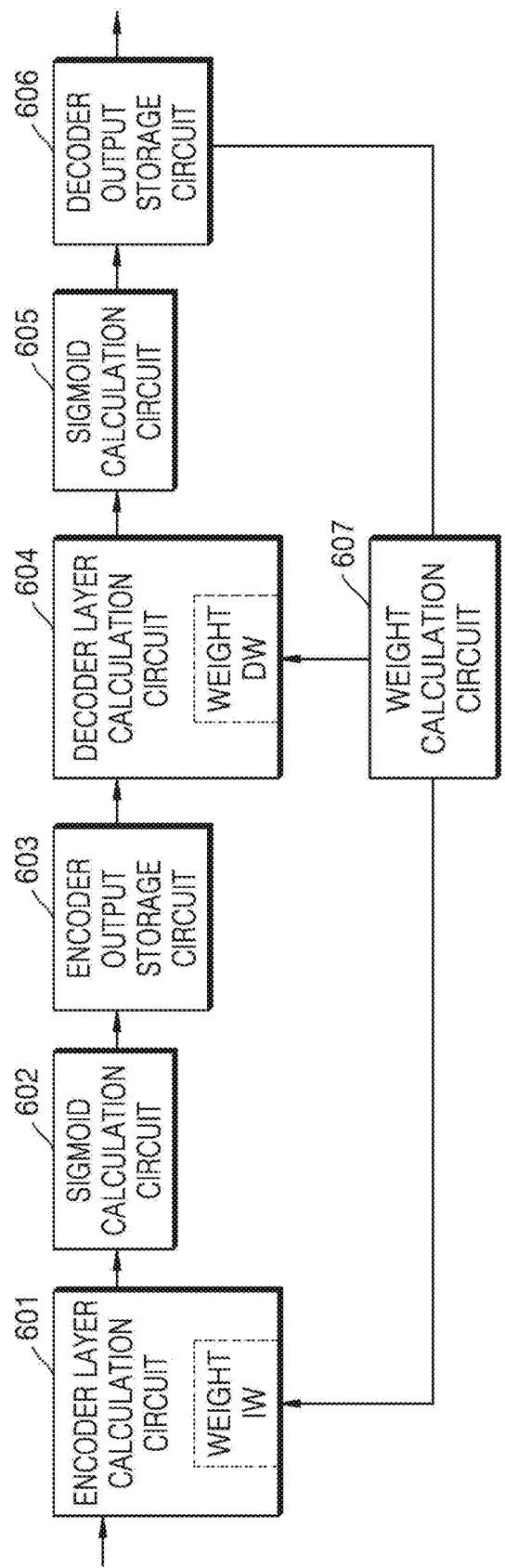
FIG. 6 is a diagram for describing a circuit configuration of processing circuitry of an anomaly detection apparatus for driving a neural network that processes anomaly detection of FIG. 5, according to some example embodiments.

FIG. 6 is a diagram for describing a circuit configuration of a processing circuitry of an anomaly detection apparatus for driving a neural network that processes anomaly detection of FIG. 5, according to some example embodiments.

Referring to FIG. 6, the processing circuitry 120 (see FIG. 3) includes an encoder layer calculation circuit 601, a sigmoid calculation circuit 602, an encoder output storage circuit 603, a decoder layer calculation circuit 604, a sigmoid calculation circuit 605, the decoder output storage circuit 606, and a weight calculation circuit 607. However, in the circuit configuration of the processing circuitry 120 shown in FIG. 6, only circuit components related to the present embodiments are shown. Thus, the processing circuitry 120 of the anomaly detection apparatus 100 may further include other components in addition to the circuit components shown in FIG. 6.

The encoder layer calculation circuit 601 is a circuit unit that is configured to perform a calculation between the input features and the weight IW of the input layer-hidden layer and obtains the output of the input layer, such as described in operation 502 of FIG. 5.

The sigmoid calculation circuit 602 is a circuit unit that is configured to obtain an encoder output by performing a sigmoid calculation on the output of the input layer, such as described in operation 503 of FIG. 5.

The encoder output storage circuit 603 is a memory circuit unit that is configured to stores the encoder output obtained by sigmoid calculation circuit 602.

The decoder layer calculation circuit 604 is a circuit unit that is configured to perform a calculation between the encoder output and the weight DW of the hidden layer-output layer and obtains the output of the output layer, such as described in operation 504 of FIG. 5.

The sigmoid calculation circuit 605 is a circuit unit that is configured to obtain a decoder output by performing a sigmoid calculation on the output of the output layer, such as described in operation 505 of FIG. 5.

The decoder output storage circuit 606 is a memory circuit unit that is configured to store the decoder output obtained by the sigmoid calculation circuit 605. The decoder output stored in the decoder output storage circuit 606 corresponds to output features, and may be provided to another circuit configuration to determine whether an abnormal signal is detected, and may also be configured to provide output to the weight calculation circuit 607 to update the weight IW of the input layer-hidden layer and/or the weight DW of the hidden layer-output layer.

According to some example embodiments, such as described herein, the calculation for each layer of the unsupervised learning neural network for anomaly detection may be processed independently by layer calculation circuit units implemented in separate hardware configurations within the processing circuitry 120.

However, the present disclosure is not limited thereto, and as described below with reference to FIGS. 7A and 7B, hardware circuit configurations configured to process a calculation on each layer of the neural network may vary.

Figure 7A:
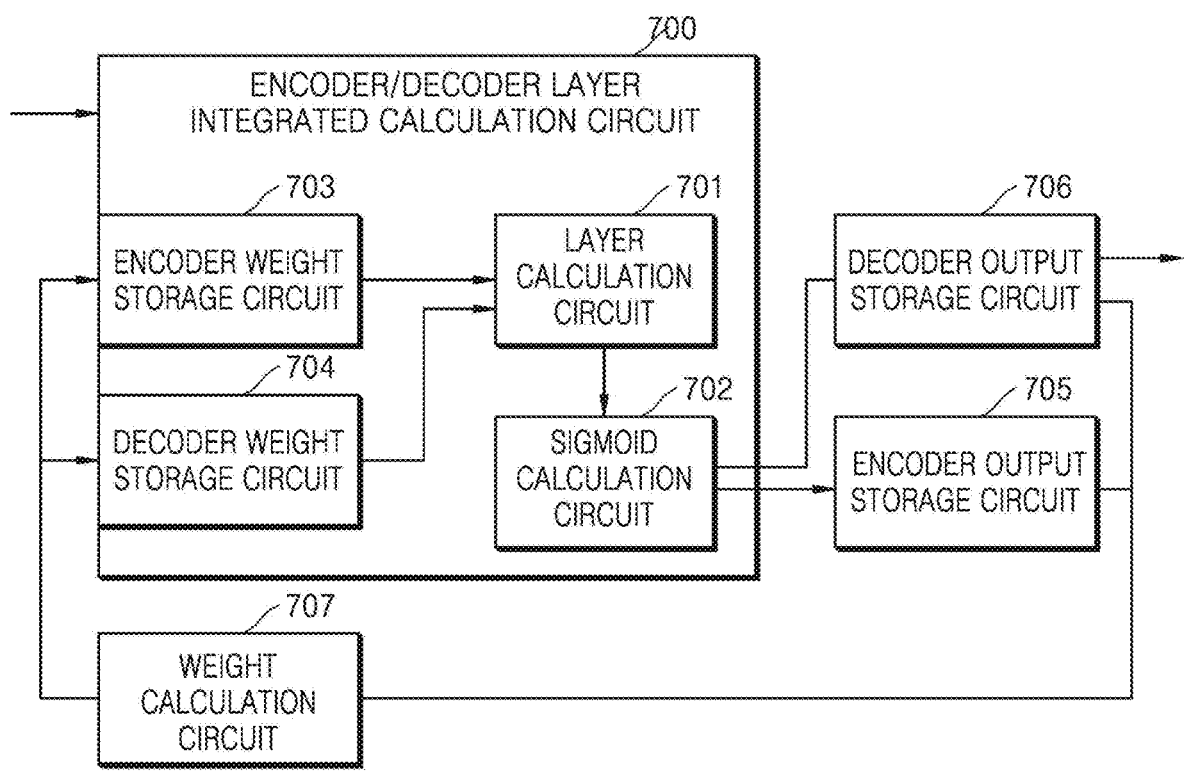
FIGS. 7A and 7B are diagrams for describing a circuit configuration of processing circuitry of an anomaly detection apparatus for driving a neural network that processes anomaly detection of FIG. 5, according to some example embodiments.
Figure 7B:
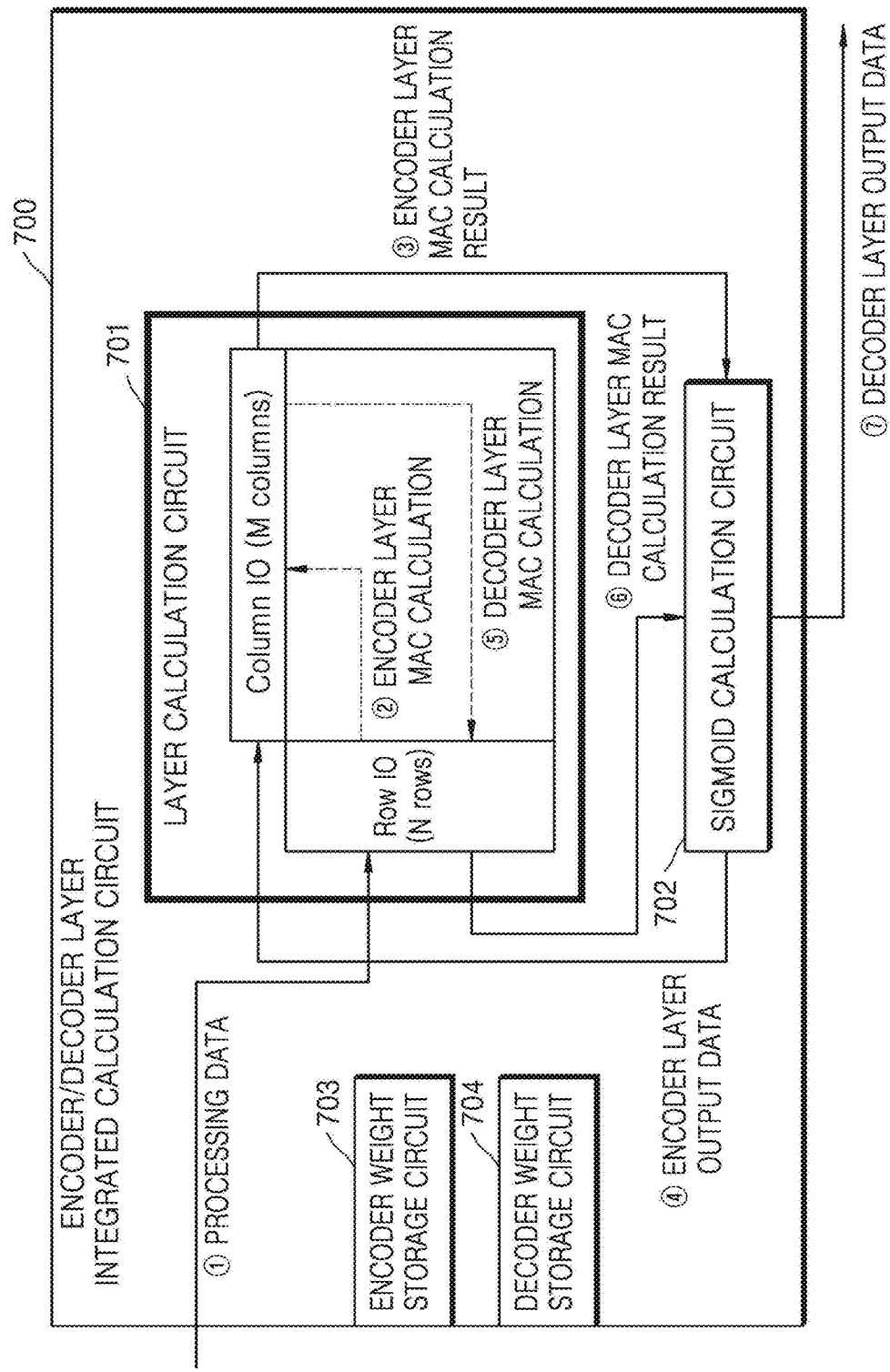

FIGS. 7A and 7B are diagrams of circuit configurations of processing circuitry of an anomaly detection apparatus for driving a neural network that processes anomaly detection of FIG. 5, according to some example embodiments.

Referring to FIGS. 7A and 7B, unlike the example embodiment shown in FIG. 6, the processing circuitry 120 (see FIG. 3) may include an encoder/decoder layer integrated calculation circuit 700 configured to process calculations on an encoder layer and a decoder layer.

As shown in FIG. 7A, the encoder/decoder layer integrated calculation circuit 700 may include a layer calculation circuit 701, a sigmoid calculation circuit 702, an encoder weight storage circuit 703, and a decoder weight storage circuit 704.

Referring to FIG. 7B, based on the layer calculation circuit 701 performing an encoder layer MAC calculation ② by using processing data (for example, extracting input features) ①, the layer calculation circuit 701 may be configured to operate like the encoder layer calculation circuit 601 of FIG. 6. Here, the MAC calculation denotes a multiply-accumulate operation. It may be assumed that the neural network (autoencoder) is a network having an input layer (encoder layer) of N neurons, at least one hidden layer respectively comprising M neurons, and an output layer (decoder layer) of N neurons.

A calculation result (encoder layer MAC calculation result ③) for the encoder layer may be provided to the sigmoid calculation circuit 702 by the layer calculation circuit 701, and the sigmoid calculation circuit 702 may be configured to output encoder layer output data ④.

The layer calculation circuit 701 may be configured to perform a decoder layer MAC calculation ⑤ by using the encoder layer output data ④ and outputs a decoder layer MAC calculation result ⑥. That is, in this case, the layer calculation circuit 701 may be configured to operate like the decoder layer calculation circuit 604 of FIG. 6.

The sigmoid calculation circuit 702 may be configured to perform a sigmoid calculation on the decoder layer MAC calculation result ⑥ and outputs decoder layer output data ⑦.

The encoder weight storage circuit 703 and the decoder weight storage circuit 704 are memory circuit units that are configured to store of the weight IW of the input layer-hidden layer and the weight DW of the hidden layer-output layer, respectively, and the stored weights IW and DW may be updated to weights learned by the decoder layer output data ⑦.

Comparing the circuit configuration shown in FIG. 6 with the circuit configurations shown in FIGS. 7A and 7B, the encoder/decoder layer integrated calculation circuit 700 may process, with one circuit component, the encoder layer (input layer) and the decoder layer (output layer), unlike the case where the encoder layer calculation circuit 601 and the decoder output storage circuit 606 are separately implemented, and thus, a hardware area for circuit configuration in the processing circuitry 120 may be saved and a cost associated with data transmission and reception may be reduced. In addition, since one circuit element in the encoder/decoder layer integrated calculation circuit 700 performs layer calculations, the influence of computational errors that may be caused by errors or variations of different circuit elements between the encoder layer calculation circuit 601 and the decoder output storage circuit 606 may be reduced.

However, as described above, the circuit configuration of the processing circuitry of the anomaly detection apparatus may be implemented by the example embodiments of FIGS. 6, 7A, and 7B, and/or other example embodiments, and is not limited to example embodiments of any one circuit configuration.

FIG. 8 is a diagram for describing, by using mathematical models, processing operations including performing anomaly detection, according to some example embodiments.

Referring to FIG. 8, since the processing operations are related to some example embodiments, such as those described with reference to the above-mentioned drawings, the descriptions given with reference to the above-mentioned drawings may be equally applied to FIG. 8, even if omitted below.

In operation 810, the processing circuitry 120 performs extracting input features of an input data signal.

In operation 811, the processing circuitry 120 performs a calculation between input features $I_l^{in}$ and a weight $W_{lm}^{hid}$ of an input layer-hidden layer and obtains an output $S_m^{hid}$ in of the input layer.

In operation 812, the processing circuitry 120 obtains an encoder output $I_m^{hid}$ in by performing a sigmoid operation on the output in, $S_m^{hid}$ of the input layer.

In operation 813, the encoder output $I_m^{hid}$ is input to the inputs of the output layer of the neural network 15, and the processing circuitry 120 performs a calculation between the encoder output $I_m^{hid}$ and a weight $W_{mn}^{out}$ of a hidden layer-output layer and obtains an output $S_n^{out}$ of the output layer.

In operation 814, the processing circuitry 120 obtains a decoder output (output features) $I_n^{out}$ by performing a sigmoid operation on the output $S_n^{out}$ of the output layer.

In operation 820, the processing circuitry 120 obtains an error E between the input features $I_l^{in}$ and the output features $I_n^{out}$.

In operation 830, the processing circuitry 120 determines whether the input data signal indicates an abnormal signal based on the error E and a threshold $E_{thr}$.

In operation 840, when it is determined that the input data signal indicates the abnormal signal as the error E exceeds the threshold $E_{thr}$, the processing circuitry 120 outputs information indicating that the abnormal signal is detected.

In each of operations 851, 852, 853, and 854, the processing circuitry 120 updates a weight $W_{mn}^{in}$ of the input layer-hidden layer and a weight $W_{mn}^{out}$ of the hidden layer-output layer, based on weight adjustment values $\Delta W_{mn}^{in}$ and $\Delta W_{mn}^{out}$ obtained by gradient descent.

Figure 9:
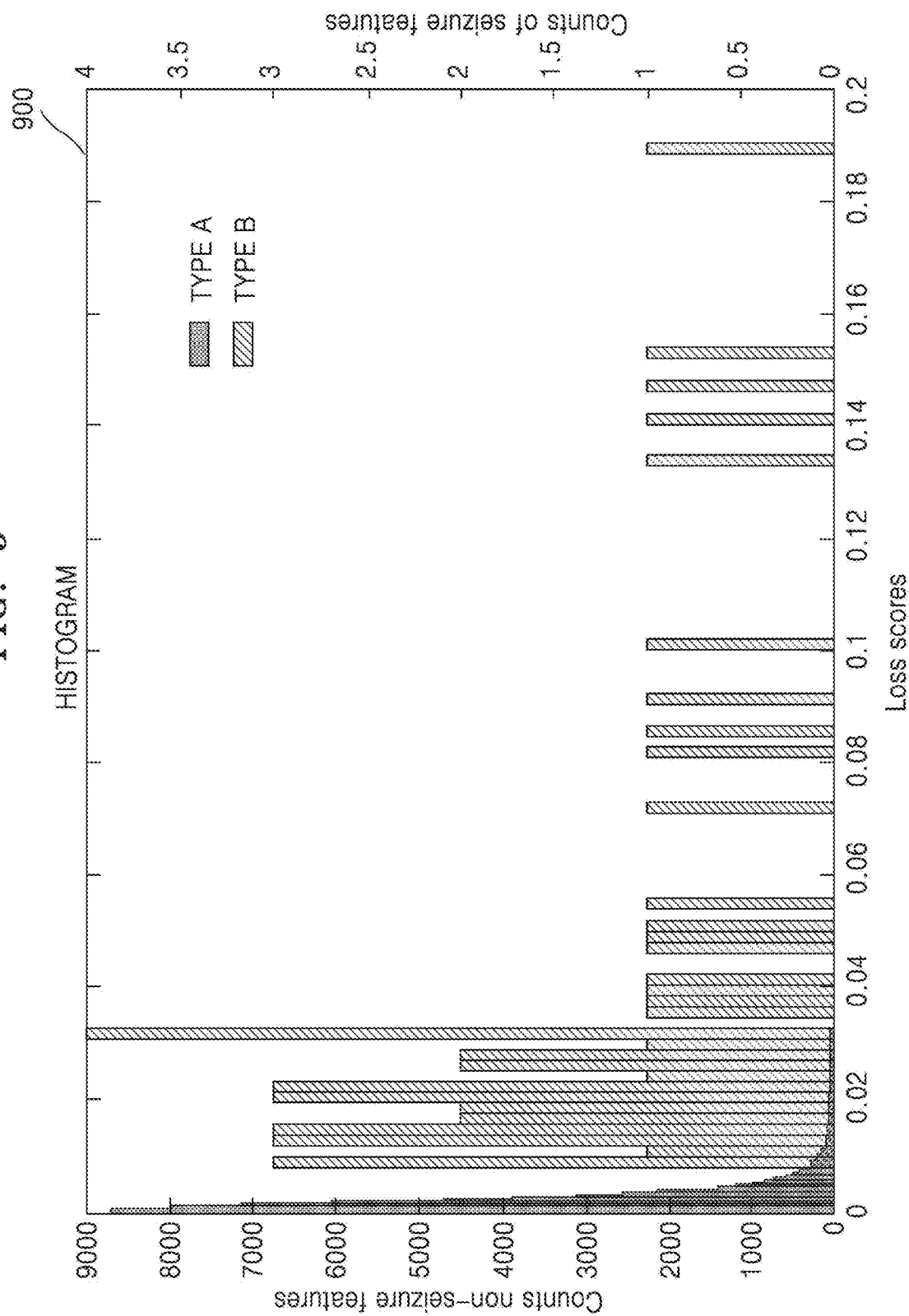

FIGS. 9 and 10 are diagrams for describing simulation results involving a diagnosis of epilepsy in an electroencephalogram (EEG) sensor-based epilepsy disease determination system using an anomaly detection apparatus, according to some example embodiments.

Referring to FIG. 9, a total of 24 subjects were simulated with input data based on EEG data during epilepsy occurrence and normal EEG data, which were continuously measured for 9 to 42 hours, and each of the 24 subjects provided 256 samples/s records through 23 electrodes.

The simulation calculated an MSE (loss score) between a data signal input to an autoencoder neural network and a data signal output therefrom and evaluated whether it is possible to distinguish between normal and epilepsy occurrence.

As shown in a histogram 900 of FIG. 9, a normal data signal TYPE A has a loss score close to zero, and a signal TYPE B when epilepsy occurs has different loss scores, but has a value equal to or greater than 0.01, and thus, it may be seen that the normal data signal TYPE A and the signal TYPE B are easily distinguished from each other.

Referring to FIG. 10, based on the evaluation of the accuracy of data of five subjects (Patients A to E), it may be seen that a result 1010 of evaluating a success rate in determining an epilepsy disease has a high accuracy of about 96% or more. In addition, even if the number of nodes (i.e., neurons) and/or the number of layers is changed in the autoencoder neural network, use of the anomaly detection apparatus 100 according to the example embodiment may result in a high accuracy of about 96% or more (accuracy of minimum 91.5% and maximum 98.8%).

FIG. 11 is a flowchart of a method of performing anomaly detection by using a neural network, according to some example embodiments. Referring to FIG. 11, since the method of performing anomaly detection is related to some example embodiments described with reference to the above-mentioned drawings, the descriptions given with reference to the above-mentioned drawings may be equally applied to the method of FIG. 9, even if omitted below.

In operation 1110, the processing circuitry 120 performs extracting input features of an input data signal.

In operation 1120, the processing circuitry 120 obtains output features of the neural network 15 corresponding to the output of the decoder by processing the input features using the neural network 15 including layers of the encoder and the decoder.

In operation 1130, the processing circuitry 120 obtains an error based on the input features and the output features.

In operation 1140, the processing circuitry 120 determines whether the input data signal indicates an abnormal signal based on the error and a threshold.

In operation 1150, the processing circuitry 120 outputs information indicating that the abnormal signal is detected based on determining that the input data signal indicates the abnormal signal.

Some example embodiments, such as those described herein, may be implemented in a digital computer, for example, a program that may be executed on a computer, and the programs may be stored on a computer readable recording medium. Also, structure of the data used in the above embodiments may be recorded on a computer-readable recording medium via various units. Examples of the computer-readable recording medium include magnetic storage media (e.g., ROM, floppy disks, hard disks, etc.), optical recording media (e.g., CD-ROMs, or DVDs), etc.

It should be understood that embodiments described herein should be considered in a descriptive sense only and not for purpose of limitation. Descriptions of features or aspects within each example embodiment should be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. A method of operating an anomaly detector including processing circuitry comprising a neural network, the neural network including layers of an encoder and a decoder, the method comprising:
   extracting, by the processing circuitry, input features of an input data signal;
   processing, by the processing circuitry, the input features using the neural network such that output features of the neural network corresponding to an output of the decoder are obtained;
   performing, by the processing circuitry, unsupervised learning on the neural network based on the output features such that the neural network is trained to differentiate an abnormal signal from a normal signal;
   obtaining, by the processing circuitry, an error based on the input features and the output features;
   determining, by the processing circuitry, whether the input data signal indicates the abnormal signal or the normal signal based on a comparison of the error and a threshold; and
   outputting, by the processing circuitry, information indicating that the abnormal signal is detected based on a determination that the input data signal indicates the abnormal signal,
   wherein the neural network further includes an input layer and an output layer, and
   wherein the performing of the unsupervised learning includes updating weights of the input layer and the output layer through online learning when the input data signal indicates the normal signal such that a difference between the input features and the output features decreases.

2. The method of claim 1, wherein the neural network includes,
   an autoencoder that configures the layers of the encoder and the decoder based on the input layer, at least one hidden layer, and the output layer.

3. The method of claim 2, wherein a dimension of the input layer and a dimension of the output layer are greater than a dimension of the hidden layer.

4. The method of claim 2, wherein the obtaining the error includes,
   calculating a mean squared error (MSE) between the input features and the output features.

5. The method of claim 1, wherein the performing of the unsupervised learning includes,
    updating the weights by performing learning so that the error decreases according to gradient descent.

6. The method of claim 5, wherein the performing of the unsupervised learning includes,
    updating the weights through a predetermined number of batch learnings.

7. A non-transitory computer-readable recording medium having recorded thereon a program that, when executed by processing circuitry of an apparatus, causes the apparatus to perform the method of claim 1.

8. An apparatus for performing anomaly detection by using a neural network, the apparatus comprising:
    a memory storing at least one program; and
    processing circuitry configured to perform the anomaly detection by executing the at least one program,
    wherein the processing circuitry is configured to:
        extract input features of an input data signal,
        process the input features by a neural network including an input layer, an output layer, and layers of an encoder and a decoder to obtain output features of the neural network corresponding to an output of the decoder,
        obtain an error based on the input features and the output features,
        determine whether the input data signal indicates an abnormal signal based on a comparison of the error and a threshold,
        output information indicating that the abnormal signal is detected based on determining that the input data signal indicates the abnormal signal, and
        perform unsupervised learning on the neural network based on the output features,
    wherein the performing of the unsupervised learning includes updating weights of the input layer and the output layer through online learning when the input data signal indicates a normal signal such that a difference between the input features and the output features decreases.

9. The apparatus of claim 8, wherein the neural network includes,
    an autoencoder that configures the layers of the encoder and the decoder based on the input layer, at least one hidden layer, and the output layer.

10. The apparatus of claim 9, wherein a dimension of the input layer and a dimension of the output layer are greater than a dimension of at least one of the at least one hidden layer.

11. The apparatus of claim 9, wherein the obtaining the error includes,
    calculating a mean squared error (MSE) between the input features and the output features.

12. The apparatus of claim 8, wherein the updating, through the unsupervised learning, includes,
    updating the weights by performing learning so that the error decreases according to gradient descent.

13. The apparatus of claim 12, wherein the processing circuitry is further configured to,
    update the weights through a predetermined number of batch learnings.

14. The apparatus of claim 8, wherein the processing circuitry includes,
    an encoder layer calculation circuit that is configured to perform calculation for a layer of the encoder, and
    a decoder layer calculation circuit that is configured to perform calculation for a layer of the decoder.

15. The apparatus of claim 8, wherein the processing circuitry includes,
    a layer calculation circuit configured to perform, with one circuit configuration, calculation for a layer of the encoder and calculation for a layer of the decoder.

* * * * *